United States Patent
Rueger et al.

(10) Patent No.: US 10,472,186 B1
(45) Date of Patent: Nov. 12, 2019

(54) INTER-LIBRARY EXCHANGE OF A REMOVABLE MEDIUM

(71) Applicant: International Business Machines Corporation, Armonk, NY (US)

(72) Inventors: Erik Rueger, Ockenheim (DE); Stefan Wiedemann, Kaiserslautern (DE); Robert Beiderbeck, Wassenberg (DE); Markus Schäfer, Heiligenmoschel (DE); Ole Asmussen, Henstedt-Ulzburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/141,045

(22) Filed: Sep. 25, 2018

(51) Int. Cl.
| G11B 17/22 | (2006.01) |
| B65G 47/90 | (2006.01) |
| G11B 17/26 | (2006.01) |

(52) U.S. Cl.
CPC ............ *B65G 47/90* (2013.01); *G11B 17/221* (2013.01); *G11B 17/26* (2013.01); *B65G 2201/02* (2013.01)

(58) Field of Classification Search
CPC .. B65G 47/90; B65G 2201/02; G11B 17/221; G11B 17/26
USPC ....................................................... 360/92.1
See application file for complete search history.

(56) References Cited

U.S. PATENT DOCUMENTS

| 6,104,564 | A * | 8/2000 | Shibuya | G11B 15/688 360/69 |
| 6,552,866 | B1 * | 4/2003 | Lechner | G11B 15/6835 360/69 |
| 6,751,040 | B2 | 6/2004 | Gupta et al. | |
| 8,139,314 | B2 | 3/2012 | Green et al. | |
| 9,093,088 | B1 | 7/2015 | Krick et al. | |
| 9,202,485 | B1 | 12/2015 | Krick et al. | |
| 9,334,117 | B2 | 5/2016 | Imai et al. | |
| 9,431,049 | B2 | 8/2016 | Krick et al. | |
| 2006/0087927 | A1 * | 4/2006 | Sasaki | G11B 15/689 369/30.27 |
| 2013/0044390 | A1 * | 2/2013 | Minemura | G11B 15/6835 360/92.1 |

(Continued)

FOREIGN PATENT DOCUMENTS

EP 1278190 B1 4/2007

OTHER PUBLICATIONS

Oracle, "StorageTek SL150 Modular Tape Library User's Guide", Oracle Help Center, Copyright 2012, 2017, 19 pages.

*Primary Examiner* — Allen T Cao
(74) *Attorney, Agent, or Firm* — Nathan M. Rau

(57) ABSTRACT

A port is used for exchanging removable media with a media library. The port includes a port housing with an opening exchanging the media between an internal volume and another opening permitting an exchange of the media between the internal volume and the media library. The port also includes a guiding funnel for guiding the media from the environment to the opening, an elastic element and a plate for receiving the medium. The elastic element and the plate are installed in the internal volume, and the plate is coupled to the elastic element. The elastic element is configured for pressing the plate against the opening to seal the port when the plate is unloaded and for permitting a movement of the plate into the internal volume to allow the exchange of the medium through the other opening when the plate is loaded.

20 Claims, 10 Drawing Sheets

(56) References Cited

U.S. PATENT DOCUMENTS

2015/0050106 A1    2/2015   Thompson et al.
2015/0071744 A1*   3/2015   Miyaguchi ......... G11B 15/6835
                                                                                       414/277

* cited by examiner

INTER-LIBRARY EXCHANGE OF A REMOVABLE MEDIUM

BACKGROUND

The present disclosure relates to automatic media libraries, and more particularly, to the exchange of removable media between automatic media libraries.

Modern datacenters usually host more than one media library. Removable media, e.g., magnetic tape cartridges, are regularly exchanged between these libraries. For example, each library has to be filled with new media, old and/or defective media have to be removed, archive media have to be put into an external shelter, media have to be sent to another client and media have to be transferred between libraries to increase flexibility of data access and to split an access workload.

One approach to meet some of these requirements can be to interconnect libraries through a shuttle connection tube, in order to transfer the removable media across different library strings using a rail cart.

SUMMARY

Embodiments may be directed towards a port for exchanging a removable medium with a media library, the port comprising a port housing, the port housing comprising a first opening and a second opening, the first opening being configured for permitting an exchange of the removable medium between an internal volume of the port housing and an environment of the port, the second opening being configured for permitting an exchange of the removable medium between the internal volume and the media library, the port further comprising: a guiding funnel configured for guiding the removable medium from the environment to the first opening; an elastic element; and a plate for receiving the removable medium, the elastic element and the plate being installed in the internal volume, the plate being coupled to the elastic element, the elastic element being configured for pressing the plate against the first opening to seal the port when the plate is unloaded and for permitting a movement of the plate into the internal volume to allow the exchange of the removable medium through the second opening when the plate is loaded.

Embodiments may also be directed towards a library system for a removable medium, the system comprising a library frame and a port for exchanging the removable medium between the library frame and an environment of the library frame, the library frame comprising: a library rack, the library rack being configured for receiving the removable medium in a storage slot of the library rack and/or in a drive installed in the library rack; and an accessor for transporting the removable medium between the storage slot and/or the drive and the port, the port comprising a port housing, the port housing comprising a first opening and a second opening, the first opening being configured for permitting an exchange of the removable medium between an internal volume of the port housing and an environment of the library frame, the accessor being configured for exchanging the removable medium with the internal volume of the port housing through the second opening, the port further comprising: a guiding funnel configured for guiding the removable medium from the environment to the first opening; an elastic element; and a plate for receiving the removable medium, the elastic element and the plate being installed in the internal volume of the port housing, the plate being coupled to the elastic element, the elastic element being configured for pressing the plate against the first opening to seal the port when the plate is unloaded and for permitting a movement of the plate into the internal volume of the port housing to allow the exchange of the removable medium through the second opening when the plate is loaded.

Embodiments may also be directed towards a computer-implemented method of operating a library system for a removable medium, the library system comprising a library frame, a port for exchanging the removable medium between the library frame and an environment of the library frame, a magazine for transporting the removable medium, and a controller for controlling the movement of an accessor of the library frame, the port comprising a port housing, the port housing comprising a first opening and a second opening, the first opening being configured for permitting an exchange of the removable medium between an internal volume of the port housing and an environment of the library frame, the accessor being configured for exchanging the removable medium with the internal volume of the port housing through the second opening, the port further comprising: a guiding funnel configured for guiding the removable medium from the environment to the first opening; an elastic element; and a plate for receiving the removable medium, the elastic element and the plate being installed in the internal volume of the port housing, the plate being coupled to the elastic element, the elastic element being configured for pressing the plate against the first opening to seal the port when the plate is unloaded and for permitting a movement of the plate into the internal volume of the port housing to allow the exchange of the removable medium through the second opening when the plate is loaded, the method comprising, by the controller, causing the accessor to exchange the removable medium with the magazine.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
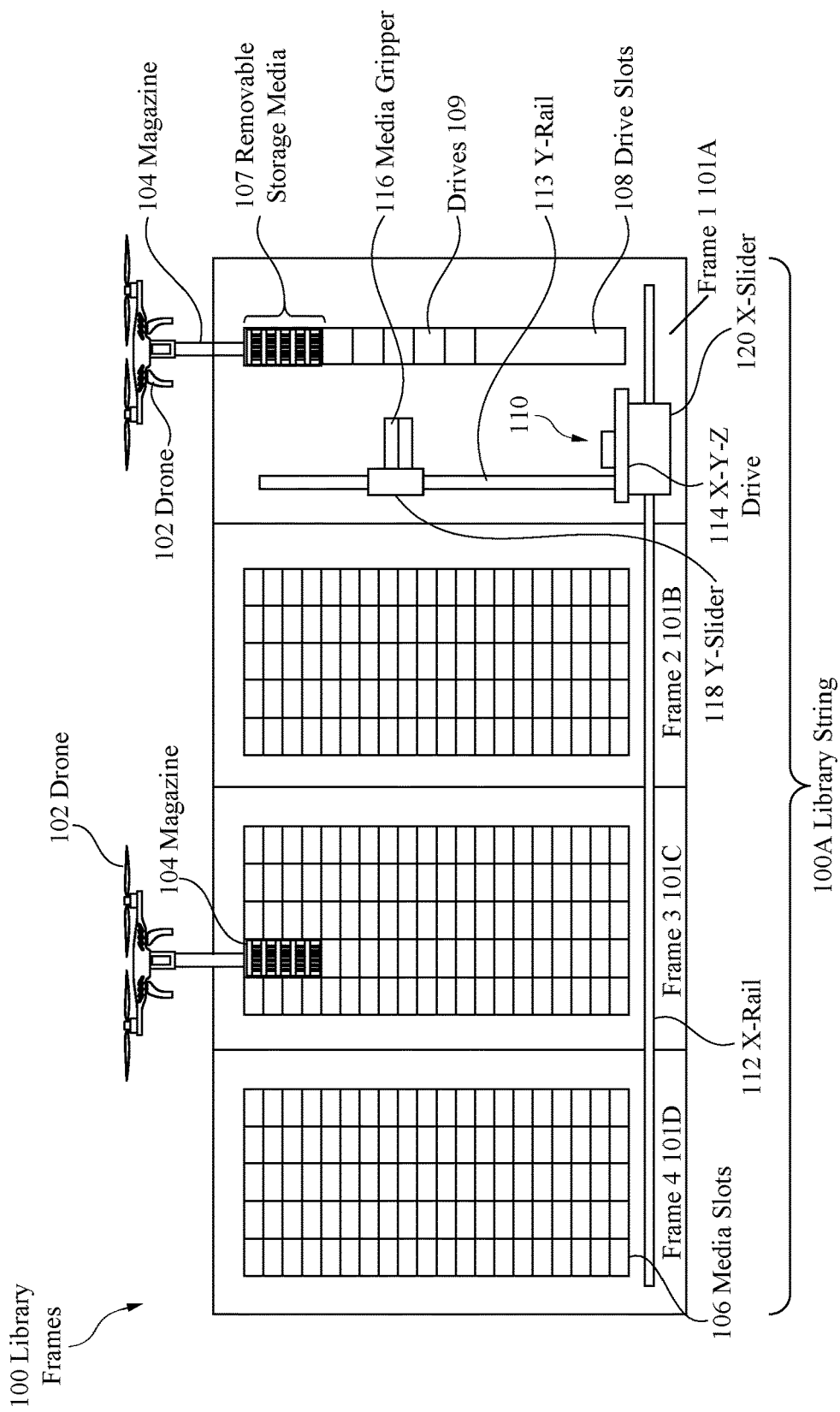
FIG. 1 depicts usage scenarios of a port within a typical media library, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Media libraries for removable media, such as tape libraries, can contain a number of library frames which can be grouped into library strings. A library frame can be a pure storage library frame for storing a number of removable media, a drive library frame hosting a number of drives for performing read and/or write operations in the removable media, or a combination of both. Library frames within one string are intended to stay permanently interconnected and media can be handled within one string by a common accessor or a cross-library frame-boundary handling unit. Removable media may be exchanged between detached strings or library frames of the same type using a permanently installed rail-based shuttle extension which requires arrangement of the strings or library frames in a dedicated spatial pattern which permits the operation of the shuttle.

According to the tremendous growth of the volume of data usage over the last several years, the demand of service information technology (IT) datacenters for storage capacity has been continuously growing. There is therefore a need for a more flexible use of the physical space offered by a storage datacenter, and a more flexible and faster exchange of removable storage media between the library frames of a library.

By making use of the port for exchanging a removable medium with a media library, embodiments may facilitate the use of a robotic ground vehicle for exchanging removable media between detached elements, i.e., library frames or strings, of a media library. Embodiments can therefore provide more flexible and efficient setup, arrangement, installation and operation of the library. There also may be no need for arranging library frames or strings in a parallel or linear arrangement. Library elements can be arranged with fewer distance or spatial limitations. Library frames and/or strings can be installed within more than one room with walls and/or doors between rooms. Embodiments can provide reduced restrictions on the number of library frames allowable per library frame string. Embodiments can enable to use library frames and/or strings of different types or models as the port can be generically suitable for different library frame types or models. This can be useful for improving flexibility and scalability of a media library.

Embodiments may also render fixed media exchange systems, such as a rail-based shuttle system, unnecessary. According to embodiments, data center setup can be simplified, as it may be unnecessary to install and adjust a shuttle system for interconnecting strings of library frames. Embodiments can be particularly useful in reducing effort required for maintenance or outage recovery, and may also reduce the need for human-machine interaction, as it may be unnecessary to exchange cartridges with a library element by a human operator.

Some embodiments can facilitate an automatic exchange of multiple media at a time by using a transport magazine. Furthermore, the time between the arrival of a medium at a string and its actual use, i.e., read and/or write operations by a drive, may be reduced because it may be possible to equip each library frame of a string with the port, and thus it may be unnecessary to further transport the received medium inside of the receiving string. Embodiments may provide further simplifications at a software level, as it may become unnecessary to issue a single command for each library frame-to-library frame transport of a medium. This may increase the operational efficiency and speed of a library.

According to embodiments, an elevator seal defined by an elastic element and a plate can be useful for allowing for sealing of the port, and hence the library frame where it is installed, against environmental influences such as dust and other foreign particles while the plate is unloaded. Furthermore, the elastic element can have a shock-absorbing effect when the removable medium or a heavier magazine is inserted into the port. In embodiments, the elastic element may also act as an energy reservoir for a drone picking up the medium or magazine from the port. In some embodiments, an aerial vehicle or drone may be vertically "push-started" or launched by the energy stored by the elastic element.

According to embodiments, the port can be further configured for exchanging, through the first opening, a magazine for transporting the removable medium between the internal volume and the environment. The elastic element can be configured for permitting, when the plate is loaded with the magazine, a movement of the plate into the internal volume up to an engaged position, which can be useful in increasing the operational efficiency and speed of a library.

According to embodiments, the port can also include a locking mechanism for reversibly retaining the magazine when the plate is in the engaged position. This locking mechanism can be useful in reducing the error probability during a media exchange operation by locating the magazine at a predefined position with high precision.

According to embodiments, the port can also include a station for docking a robotic vehicle transporting the removable medium. The station can include at least one of the following: a mechanism for reversibly mechanically retaining the vehicle at the first opening, a mechanism for mechanically guiding the vehicle to the first opening, a mechanism for allowing the vehicle to determine its position relative to the first opening, and an electrical terminal for charging a battery of the vehicle. These mechanisms can be useful in reducing the error probability during the approach of the vehicle/drone to the port by determining the vehicle position relative to the port with a high precision. An electrical charging terminal integral to the port can be useful in increasing the flexibility and operating distance of the vehicle/drone. The drone may be able to determine its position relative to the first opening, for example, through the use of a position mark, i.e., fiducial, in conjunction with an indoor positioning system.

According to embodiments, the port can also include a communications interface used to operatively couple the port to a controller device. The communications interface can be configured to allow the controller device to perform at least one of the following functions: detecting a current position of the plate, detecting a current status of a locking mechanism for reversibly retaining a magazine for transporting the removable medium, operating the locking mechanism, detecting a current status of an electrical terminal for charging a battery of a drone for transporting the removable medium, and operating the electrical terminal. This communications interface may enable a more comprehensive monitoring of the port status and control of the port functions.

According to embodiments, the port can also include a port controller that is operatively coupled to the communications interface. The port controller can be configured for performing, at least in response to receiving a command via the communications interface, at least one of the following functions: detecting a current position of the plate, detecting a current status of a locking mechanism for reversibly retaining a magazine for transporting the removable medium, operating the locking mechanism, detecting a current status of an electrical terminal for charging a battery of a drone for transporting the removable medium, and operating the electrical terminal. This coupling of the port controller to the communications interface can enable enhanced flexibility in the use of the port e.g., with different models of library frames or controllers having different functional ranges regarding control or monitoring of port functions.

According to embodiments, the port can be installed in the library frame at one or more of the following places: a top face of the library frame, and a lateral face of the library frame. According to embodiments, the vehicle can be either an unmanned aerial vehicle or an unmanned ground vehicle. Installing the port on top of a library frame may enable airborne media exchange, e.g., using a quadcopter drone, while a lateral port may enable the media exchange using a ground-based vehicle. Media exchange via an aerial drone may be particularly useful for providing a higher flexibility, e.g., transporting media between library segments on different floors of a building which are connected by a staircase, while a ground vehicle may offer a larger transport capacity for media exchanges on the same floor.

According to embodiments, the system can also include a controller that is operatively coupled to the accessor and the port. The controller can be configured to control the movement of the accessor and at least one of the following functions of the port: detecting a current position of the plate, detecting a current status of a locking mechanism for reversibly retaining a magazine for transporting the removable medium, operating the locking mechanism, detecting a current status of an electrical terminal for charging a battery of a vehicle for transporting the removable medium, and operating the electrical terminal. This controller that is operatively coupled to the accessor and the port may allow for using e.g., a semi-autonomous vehicle which is configured for e.g., receiving from the controller an identifier for a displacement operation to a target position. Such a controller could also be useful in calculating in response a route from the present position to the target position, approaching the target position using its drive and approaching a landing site at the target position using its camera and an indoor positioning system provided by the target station. In addition, according to embodiments, a coordinated control flow for the vehicle and the library elements can be configured, e.g., by causing a source library frame to provide a requested medium at its port while the vehicle is approaching the source library frame to fetch the requested medium.

According to embodiments, the system can also include a magazine for transporting the removable medium. The magazine can include a transport slot for receiving the removable medium, the first opening configured for permitting an exchange of the magazine between the internal volume of the port housing and the environment. According to embodiments, the accessor can be configured for exchanging the removable medium with the magazine through the second opening. A guiding funnel can be configured for guiding the magazine from the environment to the first opening, and a plate can be configured for receiving the magazine. The elastic element can be configured for permitting, when the plate is loaded with the magazine, a movement of the plate into the internal volume of the port housing up to an engaged position. Using a magazine can be useful in increasing the operative efficiency of the library by increasing the transport capacity and/or by allowing a given library frame to collect a number of media in one magazine before retrieving the full magazine from the given library frame.

According to embodiments, the system can also include a robotic vehicle for transporting the magazine. The robotic vehicle can include a drive for synchronously displacing the vehicle in at least two degrees of freedom. In embodiments the system can also include a controller that is operatively coupled to the accessor and the port. The controller can be configured to control the movement of the accessor, the movement of the vehicle. The controller can be also configured to control at least one of the following functions of the port: detecting a current position of the plate, detecting a current status of a locking mechanism for reversibly retaining a magazine for transporting the removable medium, operating the locking mechanism, detecting a current status of an electrical terminal for charging a battery of a vehicle for transporting the removable medium, and operating the electrical terminal. Using a robotic vehicle for inter-library media exchange can provide flexibility and efficiency enhancements to setups, arrangements, installations and operations of the library.

In embodiments, a controller can be used to control the operations of the library elements, including their respective accessor units and drives. The controller can also control the movement of the vehicle, wherein the amount of control can depend on the autonomy of the on-board control of the vehicle. According to embodiments, the controller may use a communications interface and/or operate a communications network for communicating with the library elements and the vehicle. In some embodiments, the communications interface can include a wired connection between the controller and the library frame(s), and a wireless connection between the controller and the robotic vehicle.

According to embodiments, the system can also include a connector that is configured to allow the vehicle to pick up the magazine. The connector can be either permanently connected to the magazine and releasably connectable to the vehicle, or permanently connected to the vehicle and releasably connectable to the magazine. The use of a connector, for example, instead of a dedicated, vehicle-mounted pick-up mechanism may reduce the empty weight of the vehicle and hence increase its maximum payload. A connector that is affixed to a vehicle, e.g., drone, can allow the vehicle to transport different types of magazines and to maneuver close to first opening of the port while the magazine is inserted. In contrast, a connector that is affixed to a magazine can be useful in further reducing the empty weight of the vehicle/drone. In one example, the connector can be attached to a top side of the rack and the vehicle can be an aerial vehicle/drone. In another example, the connector can be attached to a lateral side of the rack and the vehicle can be a robotic ground vehicle.

The connector can include a securing means mechanism that is a counterpart of a securing mechanism of the given transport vehicle or the given magazine, respectively, to which the connector is releasably connectable. For example, the securing mechanism can be a notch which may be fastened to by a suitable media gripper or latch installed in the vehicle.

According to embodiments, the port can include a sealing device configured for sealing the first opening when the plate is loaded and for uncovering the first opening when the plate is unloaded. This sealing device can be useful in reducing the risk of dust or other foreign matter into the library in cases when the plate is not closing the first opening. According to embodiments, the accumulated time when the library is open to its environment may be minimized. In an example, the sealing device can be a rail-guided blind with an electronically controlled drive. The drive can be triggered e.g., by a controller, a photo sensor, etc. In yet another example, the connector can be attached to the magazine and dimensioned such that the first opening can be closed by the sealing device while the port housing is receiving the magazine.

According to embodiments, the system can also include an operator gate that includes a human-machine interface for exchanging the removable medium with an environment of the system. The operator gate can include a station for docking the robotic vehicle, where the station includes an electrical terminal for charging a battery of the transport vehicle. According to embodiments, the station can also include at least one of the following: a mechanism for reversibly mechanically retaining the vehicle at the port; a mechanism for mechanically guiding the vehicle to the port; and a mechanism for allowing the vehicle to determine its position relative to the first opening.

In embodiments, an operator gate may be of used, for example, as a central charging station for the vehicle. The operator gate can reduce the need for human-machine interaction as it may be unnecessary for a human operator to exchange cartridges with the library elements and therefore this may cause a reduction of errors in management of the library. An operator gate may be particularly useful in defining a working space for the vehicle which is separated from a human working space. In embodiments, this definition of working spaces may increase the operating speed of the library, as the robotic vehicle may move with fewer restrictions and a reduced need for safety checks. According to embodiments, two or more vehicles/drones can be simultaneously operated to further increase the efficiency and scalability of the library.

According to embodiments, the library system can also include a robotic ground vehicle for transporting the magazine, where the controller is configured for controlling the movement of the vehicle. A method can include using the controller to cause the vehicle to pick up the magazine, to approach the port, to insert the magazine into the internal volume of the port housing and to release the magazine. These operations can be useful in improving the operative efficiency, flexibility and scalability of the media library.

According to embodiments, the method can also include using the controller to receive a request for providing the removable medium at the library frame, to cause the vehicle to move to a source station from which the removable medium can be retrieved and to cause the vehicle to pick up the removable medium by picking up the magazine storing the removable medium at the source station. According to embodiments, these operations can allow the controller to determine the workflows of the system components in dependence of jobs or requests generated by an external computing system such as a storage management server.

According to embodiments, the method can also include, identifying with the controller, a station from which the vehicle can retrieve the requested removable medium as the source station. This identification can be useful in increasing the flexibility of the system, e.g., can provide read and/or write operations on the medium even if the exact location was not known when the requesting job was generated.

According to embodiments, the method can also include using the controller to cause the vehicle to restrict its movement to a predefined route. This movement restriction can be useful in reducing the risk of vehicle, e.g., drone, collisions and improve the overall safety of the system. For example, the operations of the library system can be uninterrupted during a maintenance visit. The risk of a collision between the robotic vehicle and a person in the library can be reduced, for example by equipping the library floor with warning stickers designating the positions of flight corridors of a robotic drone.

According to embodiments, the method can also include determining with the controller, whether to use the vehicle for transporting the removable medium, and starting the method only if the determination is that the vehicle shall be used for transporting the removable medium. This determination may prevent unnecessary uses of the vehicle, e.g., if the requested medium is already present within the same library string as the requesting library frame. In such a case, the medium can be transported with an on-string mechanism instead.

In some embodiments, the media library is a tape library and the removable medium can be a magnetic tape cartridge. According to embodiments, the port can also include a means for detecting whether the magazine is in the engaged position.

Now turning to the figures, FIG. 1 depicts an example library string 100A that includes four library frames; frames 101A, 101B, 101C and 101D, each of which can host a number of media slots 106, and/or drive slots 108, which are accessible by an accessor unit 110 that is common for each of the x, y and z axes. The library frames 100 are numbered 1-4 from right to left. Library frame 1 101A includes drive slots 108 having installed therein a number of media drives 109 that are configured to perform read and/or write operations on removable media hosted by the library string 100A. Library frame 2 101B, frame 3 101C, and frame 4 101D include a number of media slots 106 configured to host a number of removable storage media 107 to be used by the media drives 109 hosted by library frame 1 101A. The accessor unit 110 includes a media gripper 116 that can automatically grip and hold a removable storage media 107 and an x-y-z drive 114 for moving the media gripper 116, with X-slider 120 and Y-slider 118, along rails 112 and 113, respectively. According to embodiments, the media gripper 116 can reach a media slot 106 or drive slot 108 at one of a number of predefined coordinates, referred to as fiducials. The direction of subsequent arrangement of the library frames 100 defines the x-axis, the coordinates along the y-axis corresponds to the vertical position of the media gripper 116, and the z-coordinate refers the distance, along the z-axis, of the media gripper 116 from the X-rail 112. According to embodiments, the media gripper 116 may be rotatable around the Y-rail 113 by using Y-slider 118.

A example of a media library including library frames 100 can be a tape library for hosting and performing read/write operations on magnetic tapes in magnetic tape cartridges. It is contemplated, however, that the present disclosure may be implemented with any other type of media library hosting a number of removable storage media 107 of any kind, including, but not limited to, optical discs, magnetic discs, solid state storage media, and the like.

Figure 3:
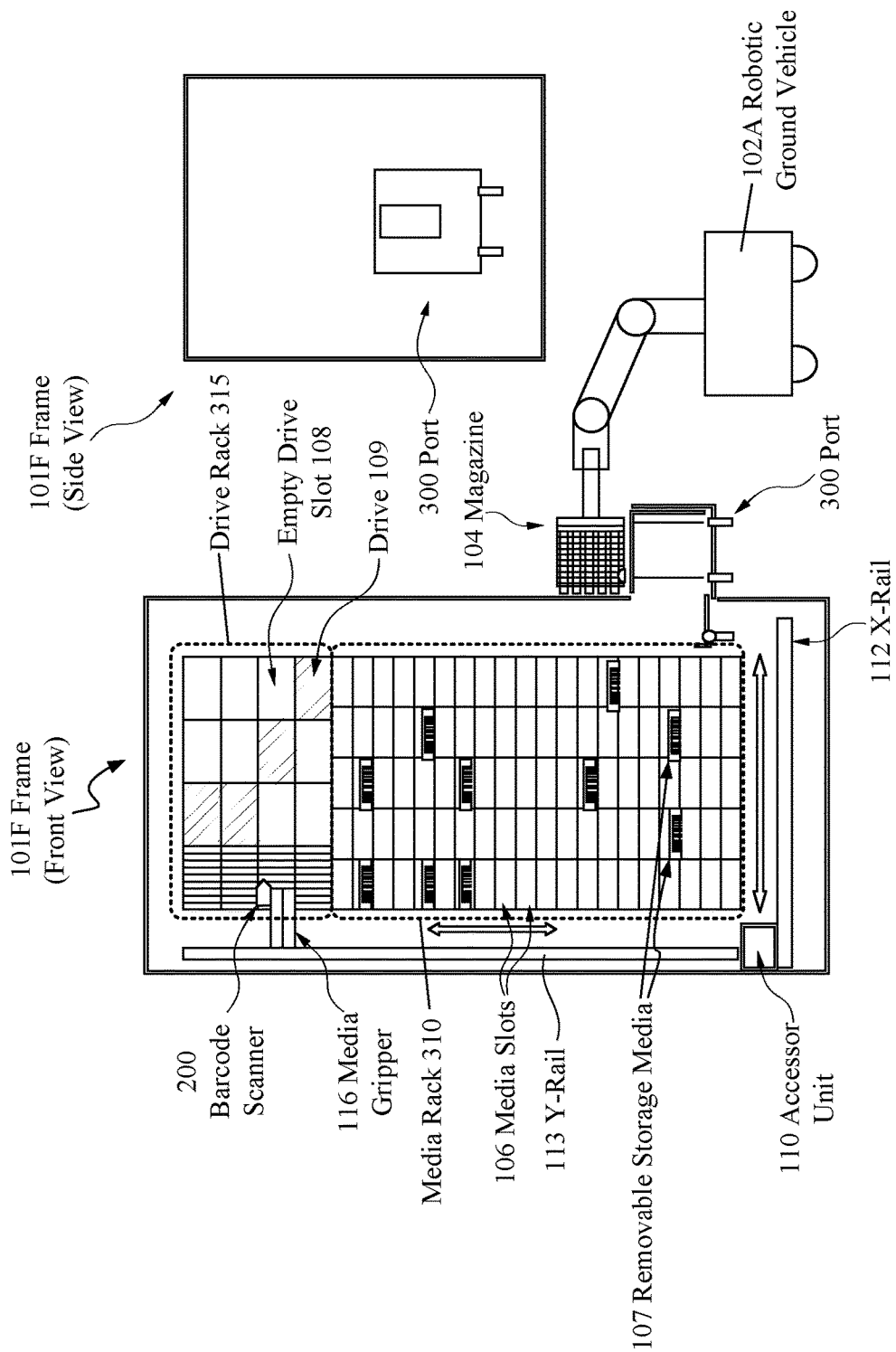
FIG. 3 depicts a laterally mounted port in use with a typical media library frame, according to embodiments consistent with the figures.

FIG. 1 also depicts two example positions where a magazine 104 for transporting a number of removable storage media 107 can be inserted into a port 300 (as discussed in more detail in the subsequent figures) of the library string 100A. In examples depicted in FIG. 1 and many example implementations illustrated by the figures herein, the removable storage media 107 are transported in a magazine 104 which is carried by a drone 102, which is a robotic quadcopter. However, the usage of a quadcopter drone 102 for transporting the magazine 104 is not mandatory, as can be seen in FIG. 3. In some embodiments it is also possible to transport the removable storage media 107 individually, instead of collecting them in a magazine 104.

In one example, library frame 1 101A includes a port 300 for receiving the magazine 104 transported by the quadcopter drone 102. When the magazine 104 is inserted into the port 300, the slots of the magazine 104 for receiving the removable storage media 107 are located at predefined fiducials of the accessor unit 110, so that removable storage media 107 can be exchanged between the library frames 100 and the magazine 104 using the accessor unit 110. In this example, the port 300 is located in a free space at the top of the library frame 1 101A, above the drive slots 108. In another example, the same principle is applied to library frame 3 101C which is a "pure media" library frame, without any media drives 109. Library frame 3 101C includes a port 300 for receiving the magazine 104 transported by the drone 102 which allows for inserting the magazine 104 into a free space of fiducials at the top of the rack for storing the removable storage media 107. In this example, the removable storage media 107 can be exchanged with the media library frames 100 using the accessor unit 110.

Figure 2:
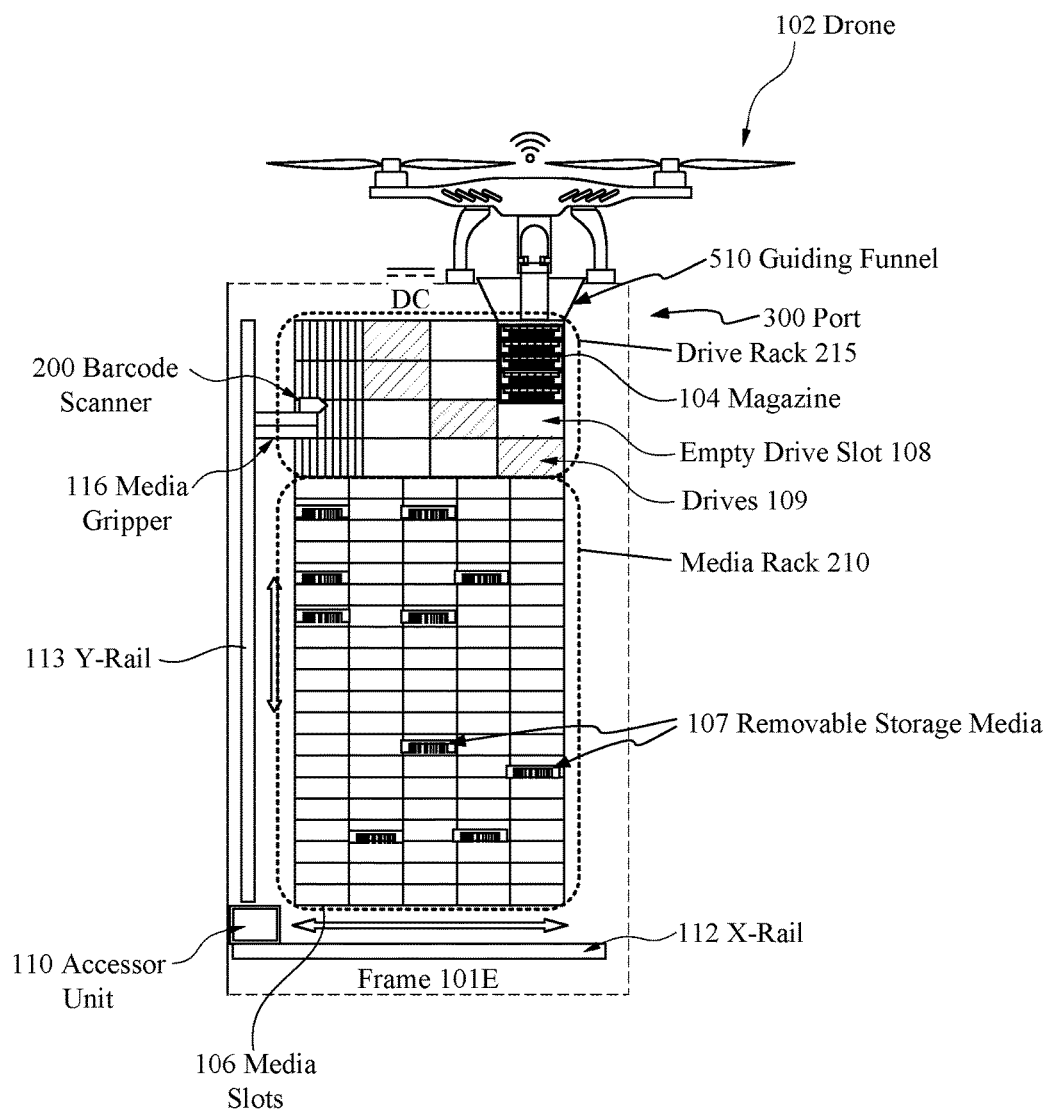
FIG. 2 depicts a top-mounted port in use with a typical media library frame, according to embodiments consistent with the figures.

FIG. 2 depicts an example library frame 101E with a drone 102 having inserted a magazine 104 for transporting removable storage media 107 into a port 300 which is positioned at the top of the library frame 101E. The library frame 101E includes an accessor unit 110 that includes a media gripper 116 and a barcode scanner 200, both of which are displaceable in the x and y directions along a respective X-rail 112 and the Y-rail 113. A lower part of the library frame 101E includes a media rack 210 for storing a number of removable storage media 107. Above the media rack 210, the library frame 101E includes a drive rack 215 hosting a number of media drives 109 for using the removable storage media 107. The port 300 is installed within a clearance of the drive rack 215 which allows for exchanging removable storage media 107 between the magazine 104 and the library frame 101E by instructing the accessor unit 110 to move to one of the fiducials which corresponds to a slot of the magazine 104.

The port 300 further contains a guiding funnel 510 for guiding the magazine 104 from the external environment towards the first opening of the port 300 for exchanging the magazine 104 between the port 300 housing and the external environment. Other implementations of the guiding funnel 510 than what is depicted in FIG. 2 are possible, involving, for example, an arrangement of magnets or a slotted link. The port 300 can be equipped with landing/electrical contact pads (See 530, FIG. 5), that include connectors DC for charging a battery of the drone 102 via corresponding connectors DC within the feed of the drone 102. The quadcopter drone 102 can be configured for an at least partially autonomous movement in response to receiving a movement command via a wireless link indicated by a wireless symbol in the figure. The drone 102 can also include a mechanism for holding a magazine 104 for transporting the removable storage media 107 during transport, and correspondingly, the magazine 104 can include a top-mounted connector (see 400, FIG. 4) which includes a securing mechanism which can be configured to fasten to a matching locking mechanism (see 402, FIG. 4) inside of the transport extension at the bottom of the drone 102.

FIG. 3 depicts a library frame 101F with an accessor unit 110, a media rack 310, a drive rack 315 and a port 300 for exchanging removable storage media 107 with the library frame 101F. The port 300 is installed laterally in the lower part of the housing of the library frame 101F and a robotic ground vehicle 102A is depicted during loading or unloading of the magazine 104 at the port 300. The ground vehicle 102A can be moved in two independent directions on the ground, and includes a hinged bracket with a mechanism for holding and retaining the magazine 104 during transport. The magazine 104 includes a connector (see 400, FIG. 4) attached to its back side, with a fastening mechanism enabling a safe transport by the ground vehicle 102A. A side view of the library frame 101F depicts that the port housing can also include a slot configured for receiving the connector 400 when the magazine 104 is inserted into the port 300. When the magazine 104 is fully inserted into the port 300, the accessor unit 110 of the library frame 101F can be used to exchange removable storage media 107 between the media library frame 101F and the magazine 104, using its barcode scanner 200 to identify, for example, the removable storage media 107 in the storage rack or the magazine 104.

Figure 4:
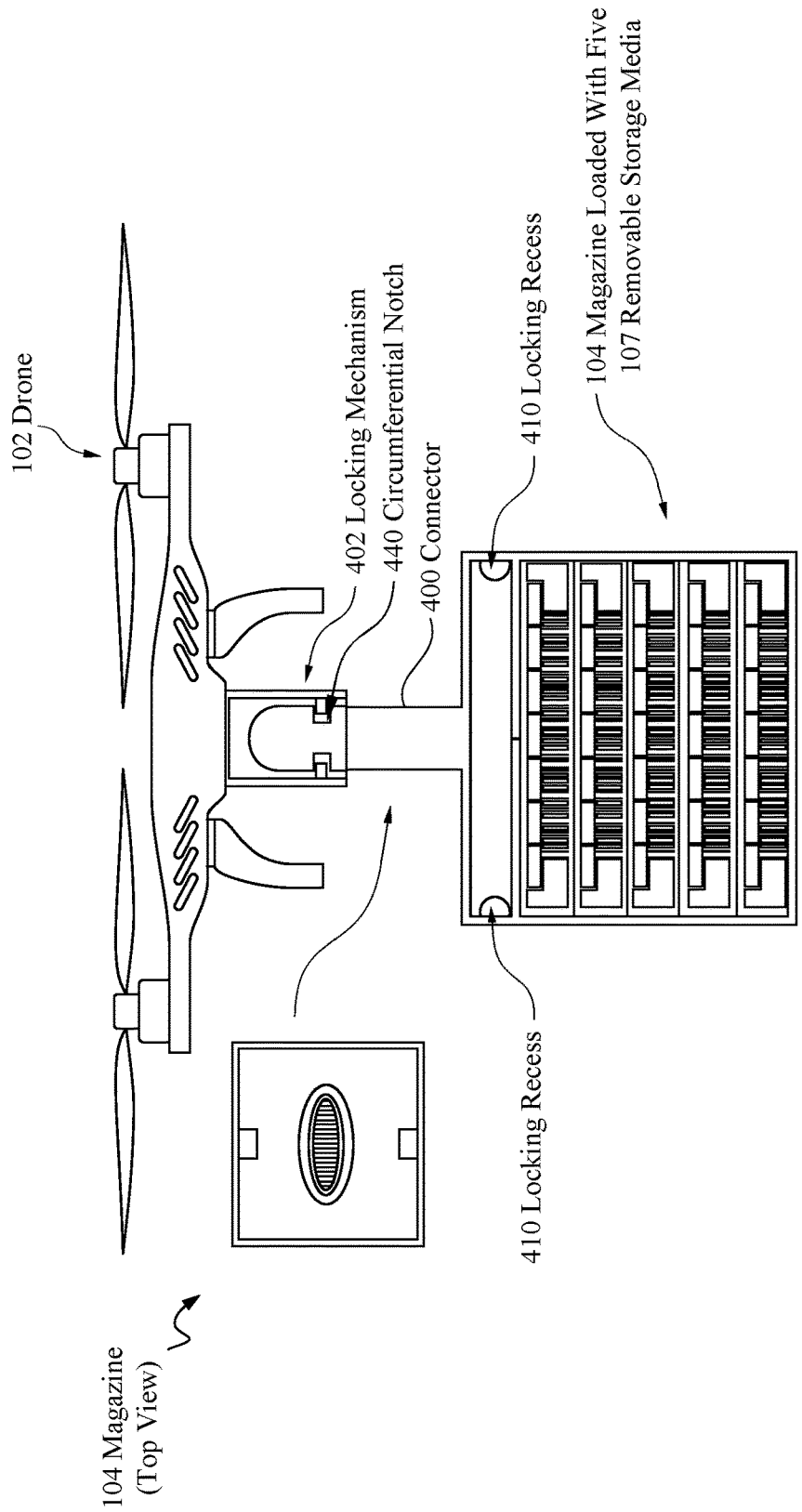
FIG. 4 depicts a quadcopter drone holding a magazine, according to embodiments consistent with the figures.

FIG. 4 is a schematic view of a quadcopter drone 102 holding a magazine 104 for transporting removable storage media 107 which depicts the mechanical interaction between the drone 102 and the magazine 104 in more detail. The magazine 104 consists of a rack with five slots and five removable storage media 107 that are inserted into the five slots of the magazine 104. The magazine 104 can also include a mechanism, e.g., locking recess 410, for retaining the magazine 104 in an engaged position within the port 300, and a connector 400 which allows the magazine 104 to be handled by a quadcopter drone 102. A top view insert depicts that the connector 400 is implemented as an elliptical rod which is oriented vertically and attached with one end to a central position at the top of the magazine 104. The drone 102 includes a shell which is attached to the lower side of the quadcopter drone 102 and configured for receiving the upper end of the elliptical rod. The rod includes a circumferential notch 440 in its upper half, while the shell of the drone 102 is equipped with a locking mechanism 402 configured for fastening to the circumferential notch 440 when the rod is inserted into the shell and for releasing the magazine 104 by unlocking the locking mechanism 402. Furthermore, the upper end of the connector 400 is rounded to facilitate the receipt of the rod by the shell.

Figure 5:
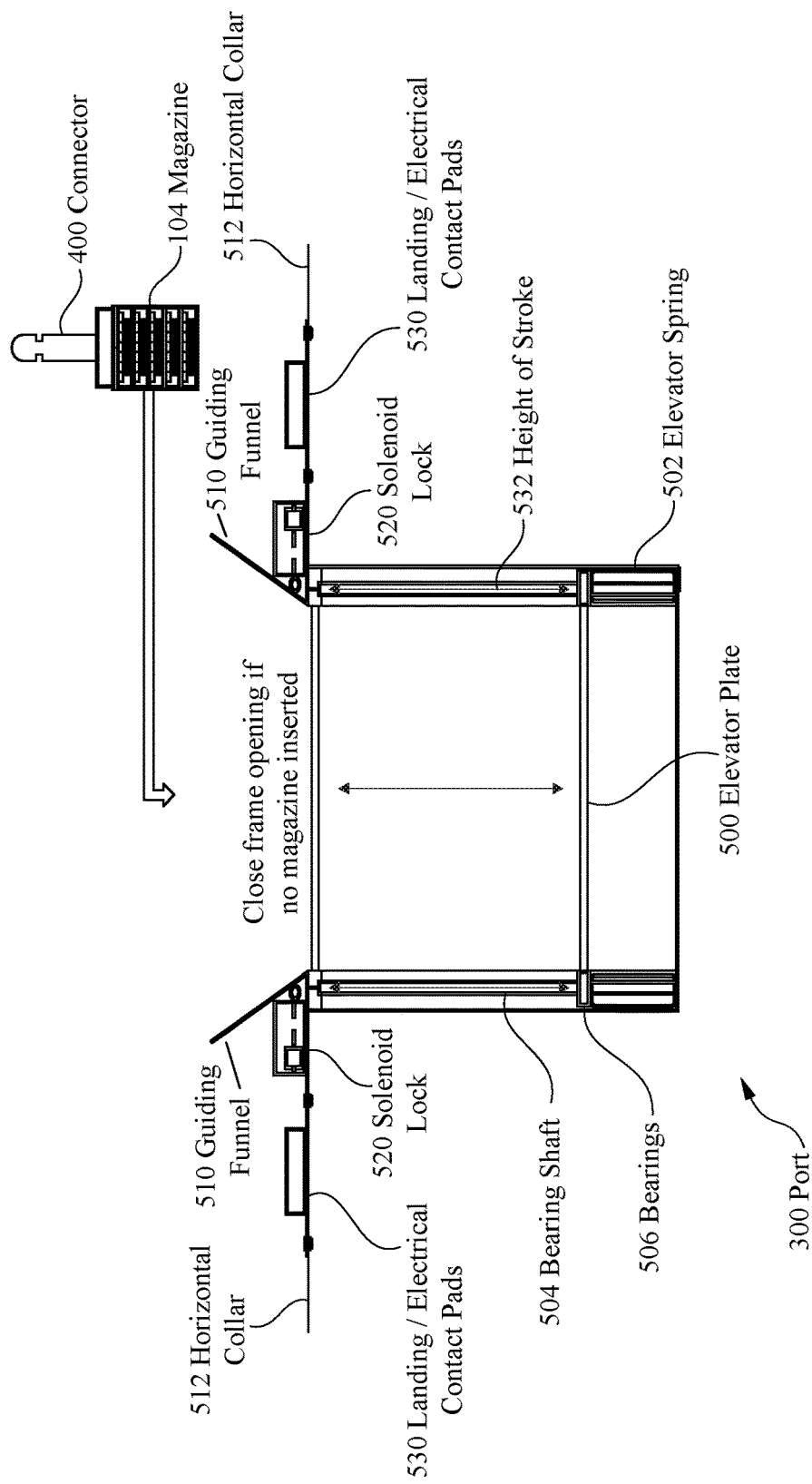
FIG. 5 depicts an example port, according to embodiments consistent with the figures.

FIG. 5 is a schematic cross-sectional view of a port 300 for exchanging removable storage media 107 with library frames 100. The port 300 includes a cuboid port housing with an elevator seal installed within its internal volume and a guiding funnel 510 outside of the first opening for guiding the removable storage media 107 from the environment to the first opening. The port 300 also includes a horizontal collar 512 surrounding the first opening below the guiding funnel 510. The elevator seal includes a set of bearing shafts 504 surrounded by elevator springs 502, a horizontal elevator plate 500 for receiving the removable storage media 107 through the first opening, and a set of bearings 506 attached to the elevator plate 500, surrounding the bearing shafts 504 and transmitting the spring force on the elevator plate 500. Note that the particular construction of the elevator seal is merely of example nature, and those skilled in the art will appreciate that various other known elevator mechanisms may fulfill the same purpose, e.g., using a single gas elevator spring 502 instead of bearing shafts 504 and bearings 506.

As the first opening and the elevator plate 500 are shown in a horizontal orientation and the bearing shafts 504 are oriented vertically, the elevator seal fulfills the function of pressing the elevator plate 500 against the first opening to seal the first opening when the elevator plate 500 is unloaded, and for permitting a movement of the elevator plate 500 into the internal volume to allow the exchange of the removable storage media 107 through the second opening, not depicted, parallel to the plane of drawing, when the elevator plate 500 is loaded. The height of stroke 532 of the elevator is defined by a desired engaged position of the elevator plate 500, which corresponds to a full insertion of the removable storage media 107 or magazine 104 such that it can be properly accessed by an accessor unit 110 of the library frames 100 where the port 300 is installed.

Installed on the horizontal collar 512 is a pair of solenoid locks 520 for retaining an inserted magazine 104 in the engaged position, as well as a pair of landing/electrical contact pads 530 for charging the battery of a battery-driven transport drone 102 docked to the port 300. Again being an illustrative example, the solenoid locks 520 may be implemented in various ways. The solenoid locks 520 shown may allow for electronically controlled locking and releasing of the magazine, but e.g., fully mechanical solenoid locks 520 are also possible, for example, based on a sprocket and a locking lever which snaps shut by the elevator plate 500 reaching the engaged position when a magazine 104 is inserted, and is released by the elevator plate 500 getting pressed below the engaged position by the weight and/or thrust of a drone 102 landing on the locked magazine 104.

Figure 6:
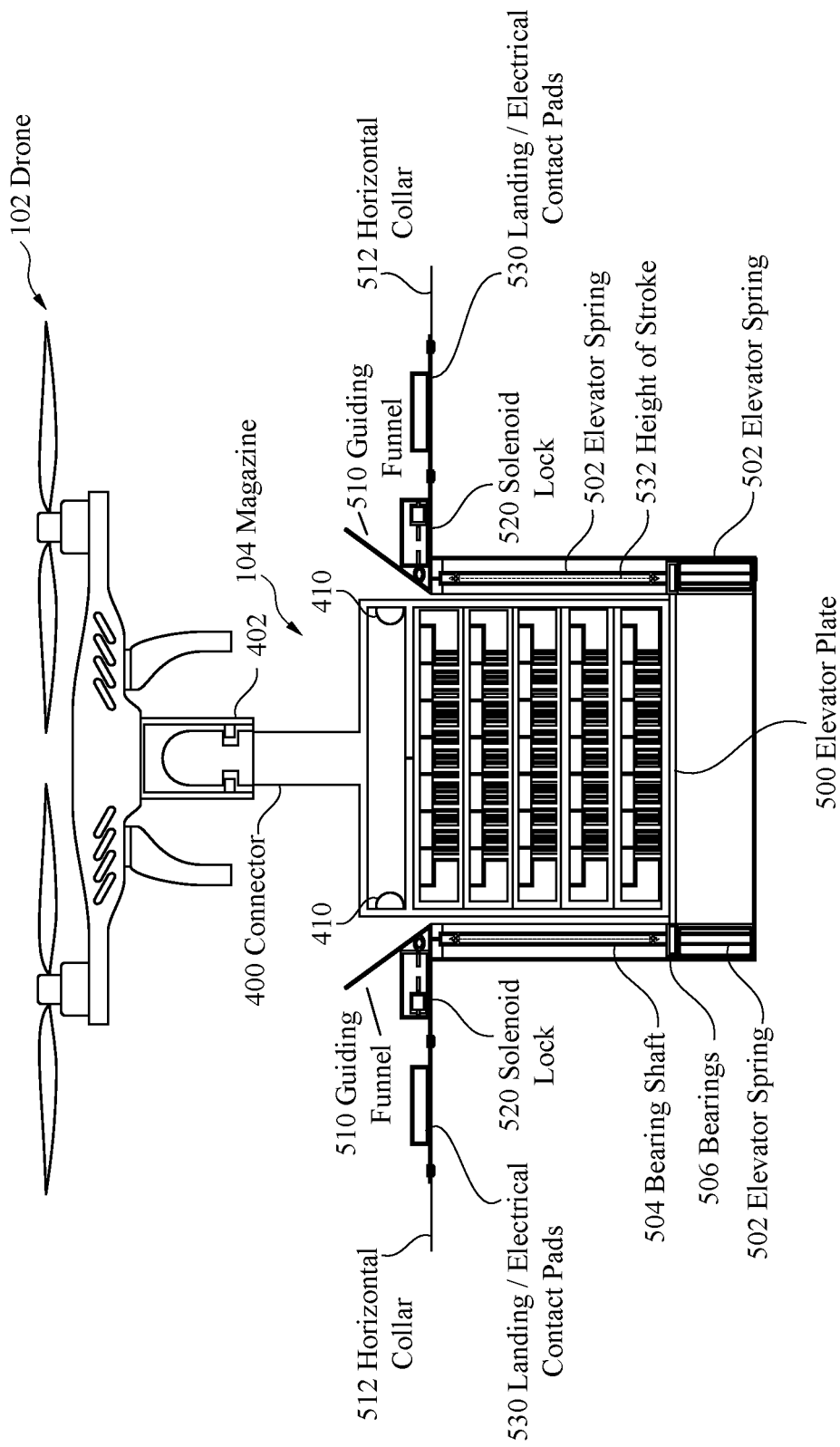
FIG. 6 depicts a quadcopter drone inserting a magazine into a port, according to embodiments consistent with the figures.

FIG. 6 depicts a quadcopter drone 102 having landed on the port 300 and thus having inserted into the port 300 a full magazine 104 carrying five removable storage media 107. The elevator plate 500 is pressed down by the effective weight of the descending drone 102, but has not yet reached the engaged position. The magazine 104 includes on its left and right upper side locking recesses 410 for receiving the latches of the solenoid locks 520.

Figure 7:
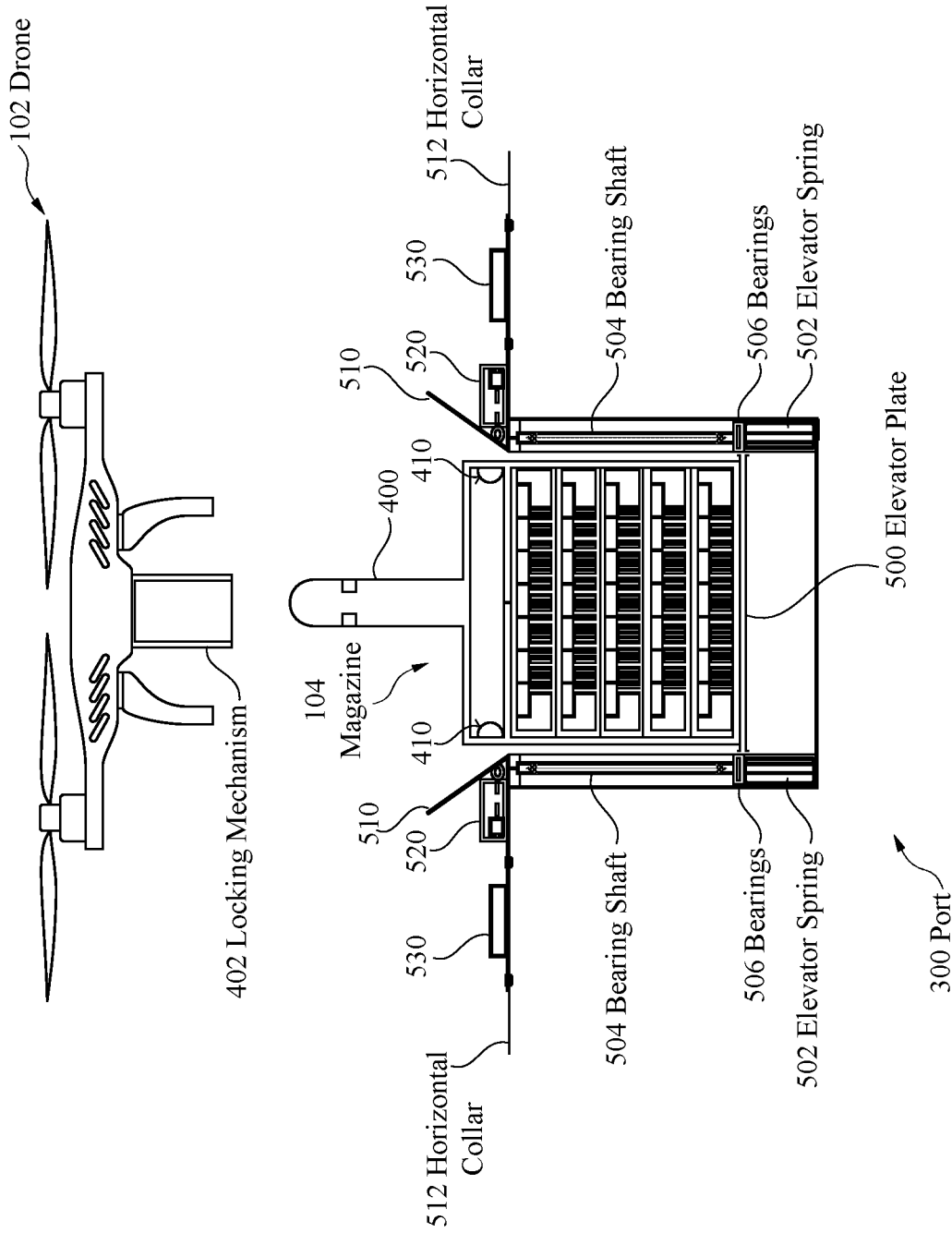
FIG. 7 depicts a quadcopter drone taking off from a magazine which is retained in an engaged position by locking mechanism, according to embodiments consistent with the figures.

FIG. 7 depicts a quadcopter drone 102 approaching or leaving the port 300 while a magazine 104 is pressing the elevator seal down to its engaged position and the latches of the solenoid locks 520 are deployed and received by the locking recesses 410 of the magazine 104 to retaining the magazine 104 in the engaged position.

Figure 8:
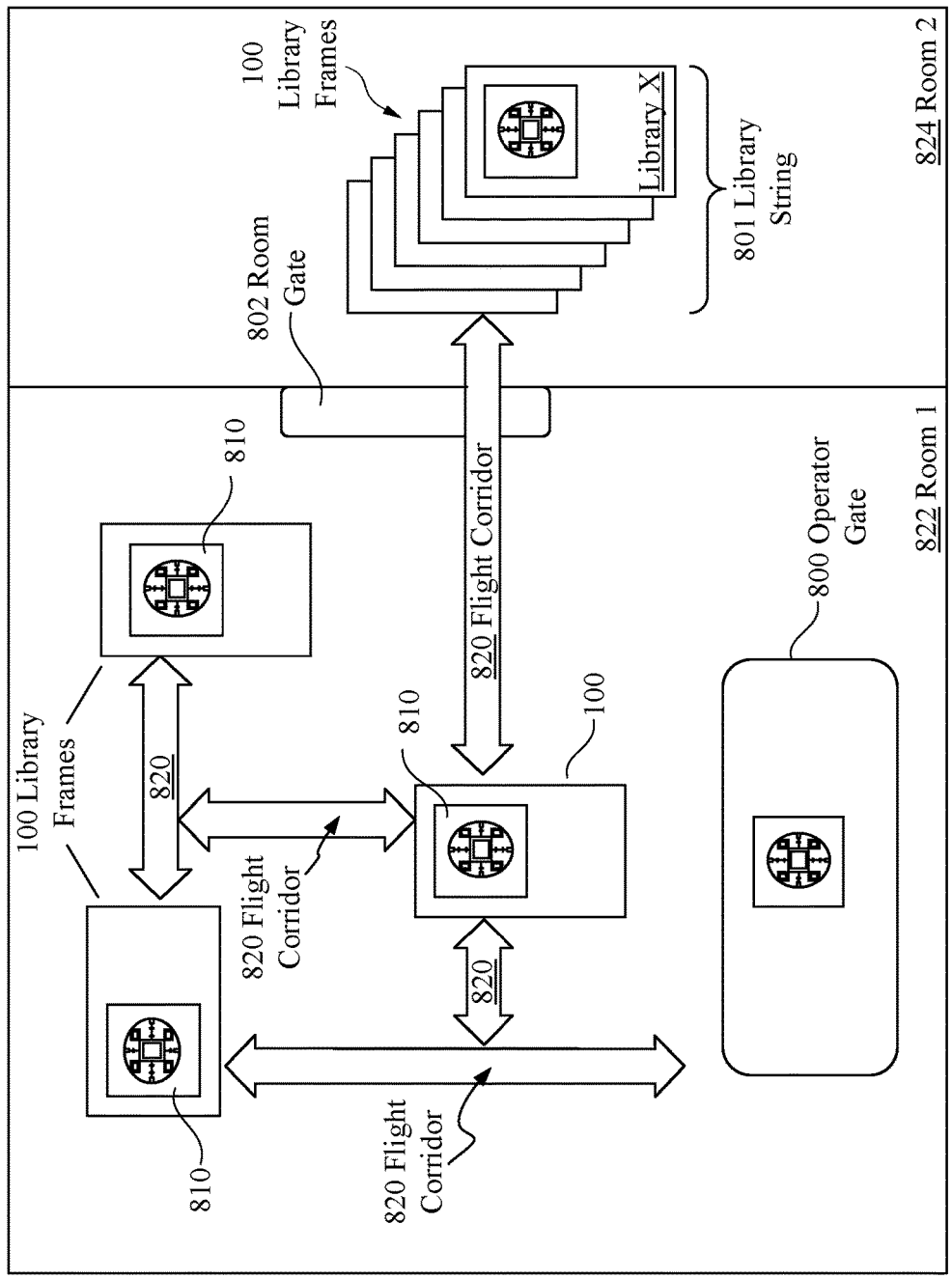
FIG. 8 depicts an example library system, according to embodiments consistent with the figures.

FIG. 8 depicts a schematic map of an example library system that includes a number of media library frames 100 which are distributed over two rooms of a building. Room 1 822 includes three single library frames 100 and room 2 824 includes a library string 801 of library frames 100. Rooms 1 and 2 are interconnected by a room gate 802, which can be, for example, an automatic door system equipped with a presence detector and an electronically controlled drive. An operator gate 800 is installed at an entrance of Room 1. According to embodiments, the three single library frames 100 of Room 1, the library string 801 of Room 2 and the operator gate 800 each include a port 300 configured to allow landing of a quadcopter drone 102, wherein each station 810 is equipped with four of landing/electrical contact pads 530 (see FIG. 5), and a position mark allowing the drone 102 to determine its relative position to the port 300. The guiding funnel 510 of the port 300 (see FIG. 5) can be shown at the center of the respective position mark. Five flight routes or flight corridors 820 are predefined as topological routes between the three single library frames 100 of Room 1, the library string 801 of Room 2 and the operator gate 800.

Figure 9:
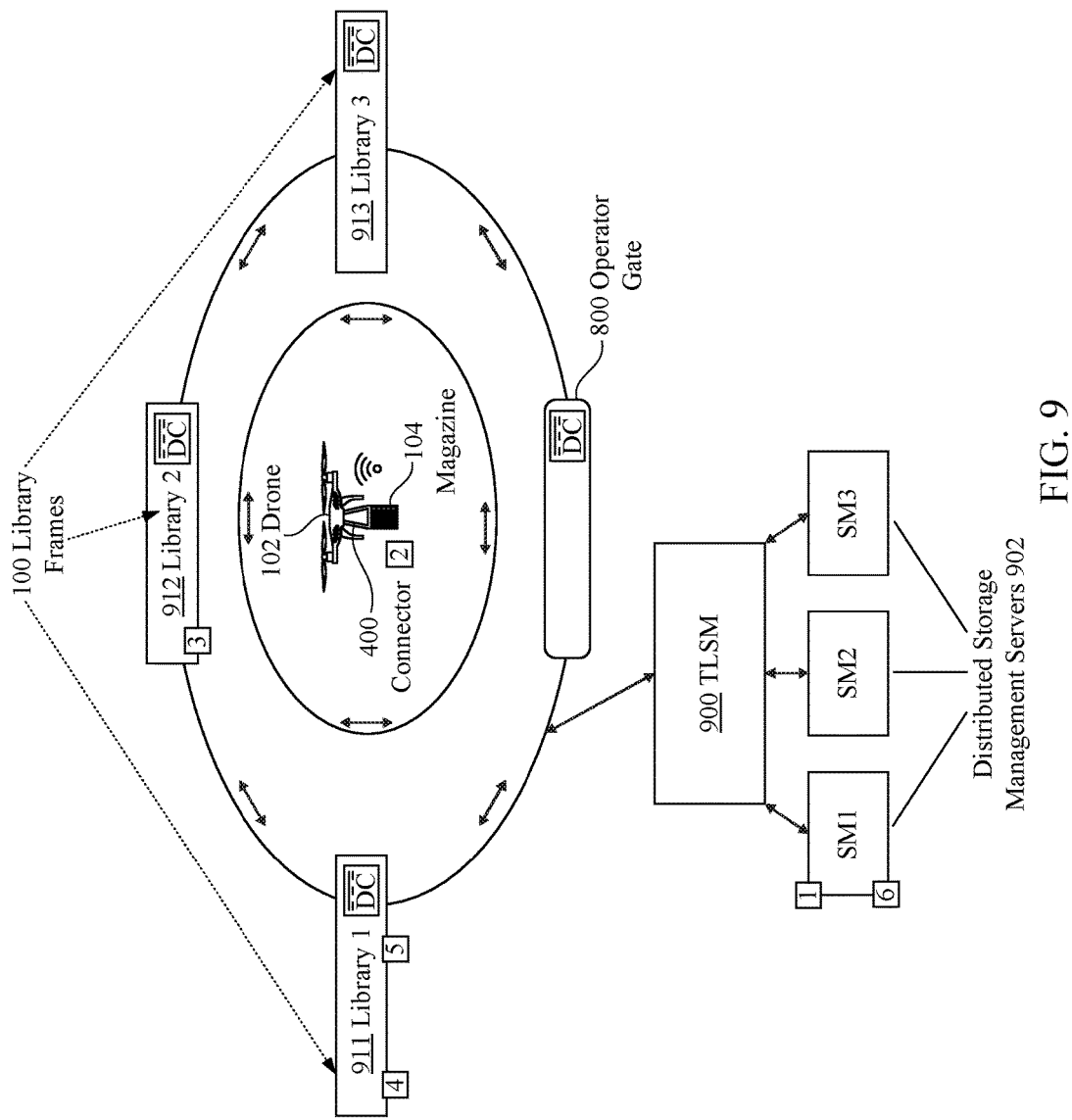
FIG. 9 depicts an example environment of a library system, according to embodiments consistent with the figures.

FIG. 9 illustrates a process flow during operation of an example library system. The on-premise total storage library manager (TSLM) 900 is a controller that receives requests and jobs from a group of distributed storage management servers 902 that includes storage managers SM1, SM2, and SM3. The library system controlled by the TSLM 900 can also include three library frames 100, i.e., library frames 100 and/or strings such as library string 801, FIG. 8, one operator gate 800, a semi-autonomous quadcopter drone 102, a magazine 104 and a connector 400 allowing the drone 102 to transport the magazine 104.

By way of example, TSLM 900 determines, during a given job issued by storage manager SM1, that a requested removable storage media 107 is to be transferred to library 1 911 in order to perform a requested read/write operation. The TSLM 900 determines that the requested removable storage media 107 is hosted by library 2 912, which is a pure storage library and detached from library 1 911. The TSLM 900 determines that the drone 102 is carrying a magazine 104 with an empty slot for the requested removable storage media 107, and instructs the drone 102 via a wireless connection to approach library 2 912.

The drone 102 uses its autonomous functionality and an indoor positioning system installed at the port 300 of library 2 912 to approach the port 300 of library 2 912 and insert the magazine 104 into the port 300 through the first opening. The TSLM 900 instructs the accessor unit 110 of library 2 912 to insert the removable storage media 107 into an empty slot of the magazine 104, e.g., slot 4. During the operation of the accessor unit 110, the drone 102 stays landed on the port 300 of library 2 912. As the TSLM 900 receives a signal via a wired inter-library communications interface that the requested removable storage media 107 was successfully inserted into slot 4, the TSLM 900 instructs the port 300 of library 2 912 to release the locking recesses 410, retaining the magazine 104 in the engaged position and instructs the drone 102 to approach library 1 911.

The drone 102 uses its autonomous functionality and an indoor positioning system installed at the port 300 of library 1 911 to approach the port 300 of library 1 911 and insert the magazine 104 into the port 300 through the first opening. The TLSM 900 instructs the accessor unit 110 of library 1 911 to pick the requested removable storage media 107 from slot 4 of the magazine 104 and insert it into an empty drive 109, e.g., drive 7, of library 1 911. During the operation of the accessor unit 110 and the drive 109, the drone 102 is instructed by the TLSM 900 to perform other media transport operations. As drive 7 completes the requested job on the requested removable storage media 107, the TLSM 900 receives a signal concerning the result of the drive operation from library 1 911 via the wired inter-library connection and forwards the result to storage manager SM1 which requested the operation.

Figure 10:
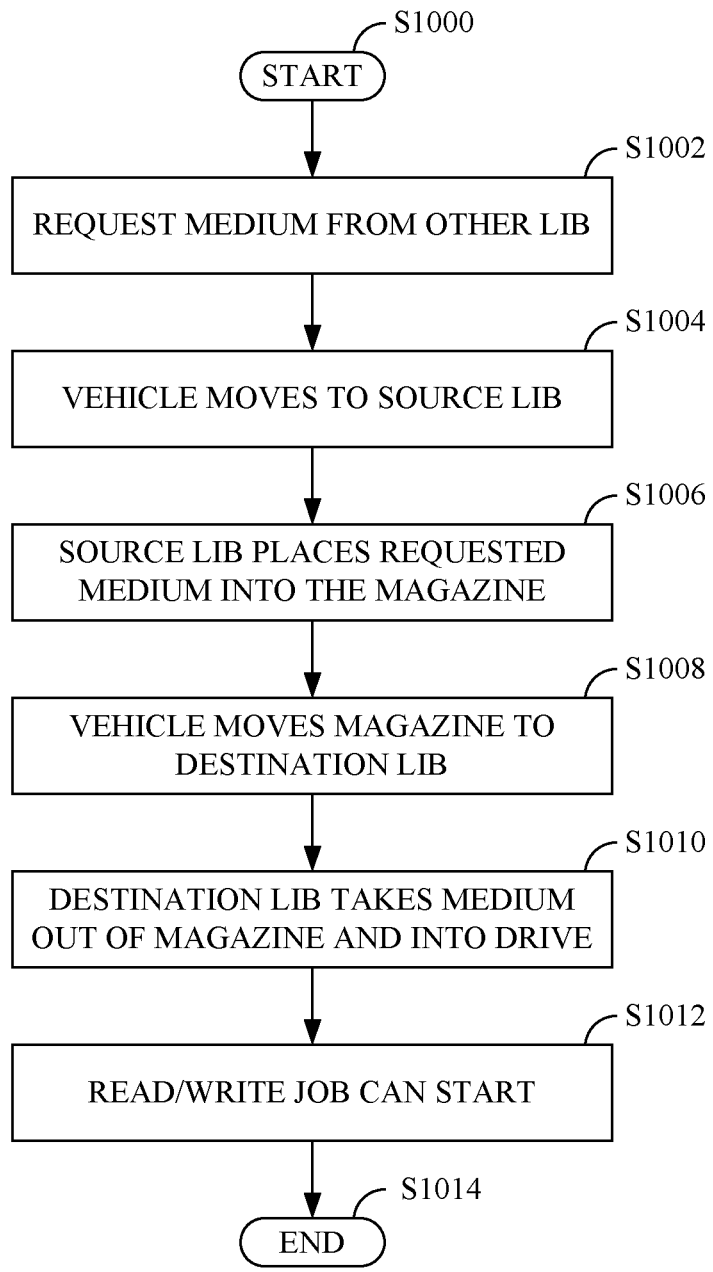
FIG. 10 depicts an example method of operating a library system, according to embodiments consistent with the figures.

FIG. 10 illustrates an example computer-implemented method of operating a library system for a removable storage media 107. The method moves from start S1000 to operation S1002. Operation S1002 generally refers to the TLSM 900 receiving a request to provide a requested removable storage media 107, FIG. 1, at a free drive 109, FIG. 1, for performing read/write operations on the requested removable storage media 107, FIG. 1, at a later point in time. In operation S1004, the TLSM 900, FIG. 9, determines a source library where the requested removable storage media 107, FIG. 1, is currently stored and sends a free drone 102, FIG. 9, to the source library. In operation S1006, while the drone 102, FIG. 9, approaches the source library, the TLSM 900 instructs the source library to place the requested removable storage media 107, FIG. 1, into a free slot of a magazine 104, FIG. 1, which is already present at the source library. As the drone 102, FIG. 9, communicates to the TLSM 900 that it has docked on the port 300, FIG. 2, of the source library, the TLSM 900 instructs, in operation S1008, the drone 102, FIG. 1, to pick up the magazine 104 holding the requested removable storage media 107 and transport the magazine 104 to the destination library. The drone 102 approaches the destination library and drops the magazine 104 into the port 300 of the destination library. As the TLSM 900 receives a signal confirming that a magazine 104 was inserted into the engaged position of the port 300 of the destination library, the TLSM 900 instructs, in operation S1010, the accessor unit 110, FIG. 1, of the destination library to pick the requested removable storage media 107 from the magazine 104 and insert it into a free drive 109 hosted by the destination library. In operation S1012, TLSM 900 sets the receiving drive 109 into standby mode so that the requested removable storage media 107 is available when the condition for starting the read/write job is fulfilled and/or a request for starting the read/write job on the requested removable storage media 107 is received by the TLSM 900. Once the receiving drive 109 is set into standby mode, the method may end at block S10014.

The present disclosure may be a system, a method, and/or a computer program product. The computer program product may include a non-transitory computer-readable storage medium, or media, having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media, e.g., light pulses passing through a fiber-optic cable, or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus, systems, and computer program products according to embodiments of the present disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational operations to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A port for exchanging a removable medium with a media library, the port comprising:
   a port housing, the port housing including a first opening and a second opening, the first opening configured to allow an exchange of the removable medium between an internal volume of the port housing and an environment external to the port, the second opening configured to allow an exchange of the removable medium between the internal volume and the media library, the port further comprising:
   a guiding funnel configured to guide the removable medium from the external environment to the first opening;
   an elastic element; and
   a plate configured to receive the removable medium, the elastic element and the plate installed within the internal volume, the plate being coupled to the elastic element, the elastic element configured to press the plate against the first opening to, in response to the plate being unloaded, seal the port, the elastic element further configured to allow a movement of the plate into the internal volume that allows, in response to the plate being loaded, the exchange of the removable medium through the second opening.

2. The port of claim 1, wherein the port is configured to exchange, between the internal volume and the external environment, through the first opening, a magazine for transporting the removable medium, the elastic element configured to allow, when the plate is loaded with the magazine, a movement of the plate into the internal volume and into an engaged position.

3. The port of claim 2, further comprising a locking mechanism configured to reversibly retain the magazine when the plate is in the engaged position.

4. The port of claim 1, further comprising a station for docking a robotic vehicle transporting the removable medium, the station including at least one mechanism selected from the group consisting of:
   a mechanism for reversibly mechanically retaining the vehicle at the first opening;
   a mechanism configured to mechanically guide the vehicle to the first opening;
   a mechanism configured to allow the vehicle to determine its position relative to the first opening; and
   an electrical terminal configured to charge a battery of the vehicle.

5. The port of claim 1, further comprising a communications interface configured to operatively couple the port to a controller device, the communications interface further configured to allow the controller device to perform a function selected from the group consisting of:
   detecting a current position of the plate;
   detecting a current status of a locking mechanism for reversibly retaining a magazine for transporting the removable medium;
   operating the locking mechanism;
   detecting a current status of an electrical terminal for charging a battery of a vehicle for transporting the removable medium; and
   operating the electrical terminal.

6. The port of claim 5, further comprising a port controller, the port controller operatively coupled to the communications interface and configured to perform, in response to receiving a command through the communications interface, a function selected from the group consisting of:
   detecting the current position of the plate;
   detecting the current status of a locking mechanism for reversibly retaining a magazine for transporting the removable medium;
   operating the locking mechanism;
   detecting the current status of an electrical terminal for charging a battery of a vehicle for transporting the removable medium; and
   operating the electrical terminal.

7. A library system for a removable medium, the library system comprising:
   a library frame; and
   a port for exchanging the removable medium between the library frame and an environment external to the library frame, the library frame including:
   a library rack configured to receive the removable medium into a location selected from the group consisting of: a storage slot of the library rack, and a drive installed in the library rack; and
   an accessor for transporting the removable medium between the selected location and the port, the port including a port housing having a first opening and a second opening, wherein the first opening is configured to allow an exchange of the removable medium between an internal volume of the port housing and an environment of the library frame, and wherein the accessor is configured to exchange the removable medium with the internal volume of the port housing through the second opening, the port further including:
- a guiding funnel configured to guide the removable medium from the environment to the first opening;
- an elastic element; and
- a plate configured to receive the removable medium, the elastic element and the plate installed in the internal volume of the port housing, the plate coupled to the elastic element, the elastic element configured to press the plate against the first opening to seal the port when the plate is unloaded, the elastic element further configured to allow a movement of the plate into the internal volume of the port housing to allow the exchange of the removable medium through the second opening in response to the plate being loaded.

8. The library system of claim 7, wherein the port is installed in the library frame at a place selected from the group consisting of: a top face of the library frame, and a lateral face of the library frame.

9. The library system of claim 7, further comprising a controller operatively coupled to the accessor and the port, the controller configured to control movement of the accessor and at least one function selected from the group consisting of:
- detecting a current position of the plate;
- detecting a current status of a locking mechanism for reversibly retaining a magazine for transporting the removable medium;
- operating the locking mechanism;
- detecting a current status of an electrical terminal for charging a battery of a vehicle for transporting the removable medium; and
- operating the electrical terminal.

10. The library system of claim 7, further comprising a magazine for transporting the removable medium, the magazine including a transport slot for receiving the removable medium, the first opening configured to allow an exchange of the magazine between the internal volume of the port housing and the external environment, the accessor configured to exchange the removable medium with the magazine through the second opening, the guiding funnel configured to guide the magazine from the external environment to the first opening, the plate configured to receive the magazine, the elastic element configured to allow, in response to the plate being loaded with the magazine, a movement of the plate into the internal volume of the port housing into an engaged position.

11. The library system of claim 9, further comprising a robotic vehicle for transporting the magazine, the robotic vehicle comprising a drive configured to synchronously move the vehicle in at least two degrees of freedom, the system further comprising a controller operatively coupled to the accessor and the port, the controller configured to control the movement of the accessor, the movement of the vehicle and at least one function selected from the group consisting of:
- detecting a current position of the plate;
- detecting a current status of a locking mechanism for reversibly retaining a magazine for transporting the removable medium;
- operating the locking mechanism;
- detecting a current status of an electrical terminal for charging a battery of a vehicle for transporting the removable medium; and
- operating the electrical terminal.

12. The library system of claim 10, further comprising a connector configured to allow the vehicle to pick up the magazine, wherein the connector configuration is selected from the group consisting of:
- permanently connected to the magazine and releasably connectable to the vehicle; and
- permanently connected to the vehicle and releasably connectable to the magazine.

13. The library system of claim 10, further comprising an operator gate, the operator gate including a human-machine interface for exchanging the removable medium with an environment of the system, the operator gate further including a station for docking the robotic vehicle, the station including an electrical terminal for charging a battery of the transport vehicle and a mechanism selected from the group consisting of:
- a mechanism for reversibly mechanically retaining the vehicle at the port;
- a mechanism for mechanically guiding the vehicle to the port; and
- a mechanism for allowing the vehicle to determine its position relative to the first opening.

14. The library system of claim 10, wherein the vehicle is selected from the group consisting of: an unmanned aerial vehicle, and an unmanned ground vehicle.

15. A method of operating a library system for a removable medium, wherein the library system includes:
- a library frame;
- a port for exchanging the removable medium between the library frame and an environment of the library frame;
- a magazine for transporting the removable medium; and
- a controller configured to control the movement of an accessor of the library frame, the port including a port housing, the port housing including a first opening and a second opening, the first opening configured to allow an exchange of the removable medium between an internal volume of the port housing and an environment external to the library frame, the accessor configured to exchange the removable medium with the internal volume of the port housing through the second opening, the port further including:
  - a guiding funnel configured to guide the removable medium from the environment to the first opening;
  - an elastic element; and
  - a plate for receiving the removable medium, the elastic element and the plate installed in the internal volume of the port housing, the plate coupled to the elastic element, the elastic element configured to press the plate against the first opening to seal the port when the plate is unloaded, the elastic element further configured to allow a movement of the plate into the internal volume of the port housing to allow the exchange of the removable medium through the second opening when the plate is loaded, the method comprising:
    - causing, with the controller, the accessor to exchange the removable medium with the magazine.

16. The method of claim 15, wherein the library system further includes a robotic vehicle for transporting the magazine, the controller further configured to control the movement of the robotic vehicle, the method further comprising, causing, with the controller, the vehicle to:
- pick up the magazine;
- approach the port;
- insert the magazine into the internal volume of the port housing; and
- release the magazine.

17. The method of claim 15, further comprising using the controller to:
  receive a request for providing the removable medium at the library frame;
  cause the vehicle to move to a source station from which the removable medium can be retrieved; and
  cause the vehicle to pick up the removable medium by picking up the magazine storing the removable medium at the source station.

18. The method of claim 16, further comprising, identifying, with the controller, a station from which the vehicle can retrieve the requested removable medium as the source station.

19. The method of claim 15, further comprising, causing, with the controller, the vehicle to restrict its movement to a predefined route.

20. The method of claim 15, further comprising:
  determining, with the controller, to use the vehicle for transporting the removable medium; and
  causing, with the controller and in response to the determining, the accessor to exchange the removable medium with the magazine.

* * * * *